United States Patent [19]

Salvati

[11] 4,301,688

[45] Nov. 24, 1981

[54] PUMP OPERATING MECHANISMS

[76] Inventor: Renato Salvati, Bucarelli St. 2557, Buenos Aires, Argentina

[21] Appl. No.: 64,751

[22] Filed: Aug. 8, 1979

[30] Foreign Application Priority Data

Aug. 8, 1978 [AR] Argentina ............................ 273238
Jul. 10, 1979 [AR] Argentina ............................ 277243

[51] Int. Cl.³ ...................... F16H 19/06; F16H 37/00
[52] U.S. Cl. ................................................... 74/37
[58] Field of Search ........................................... 74/37

[56] References Cited

U.S. PATENT DOCUMENTS 170,927 12/1875 Withington ............................ 74/37
1,756,089 4/1930 Hunter ................................... 74/37
1,970,620 8/1934 Park ....................................... 74/37
2,593,470 4/1952 Matthews et al. ..................... 74/37
4,118,993 10/1978 Miyoshi et al. ....................... 74/37

Primary Examiner—Lawrence J. Staab
Attorney, Agent, or Firm—Frishauf, Holtz, Goodman & Woodward

[57] ABSTRACT

A drive means for a pump or the like comprises a pair of spaced axles having sprocket wheels thereon interconnected by an endless chain. The end of a piston rod or plunger of a pump is connected to the chain via a plate. Rotation of one of the sprocket wheels drives the chain which in turn causes the rod or plunger to reciprocate with a stroke equal to the distance between the spaced axles.

8 Claims, 8 Drawing Figures

PUMP OPERATING MECHANISMS

The present invention relates to a mechanism for operating a pump, particularly suitable for lifting and forcing pumps having large discharge capacities and/or capable of surmounting relatively high heads of fluid, and especially to a mechanism capable of operating the pump which can be any suitable pump for operating a piston or valve which has to surmount high heads of fluid, or heads of fluid with strong back pressure, or simply impel a significant mass of fluid at each stroke. This type of pump is used for extracting oil from wells, or displacing large masses of fluid.

BACKGROUND

Use has been made of mechanisms having a great height and a large rotating counterpoise for moving the plungers of pumps operating under the above conditions, since generally speaking the length of travel of said piston or plunger is considerable.

The well-known "Perry" Manual shows the reason why it is advisable to use pumps with one or more cylinders or pistons, when it is necessary to work under the above-mentioned conditions: plunger pumps are the only ones which can operate in the range from 0 to 400 meters with an almost continuous discharge of about 520 liters per minute, under atmospheric conditions. The rotating counterpoise devices or mechanism, apart from being extremely expensive, are also difficult to install, and even more difficult to transport, since the masses which help to counter-balance the forces acting on the piston or plunger are considerable. Again, these rotating masses, being extremely heavy in relation to the weight of the rest of the equipment, require a whole structure and anchoring of appreciable size, and in addition their speed of rotation is necessarily low.

THE INVENTION

It is an object to overcome the above-mentioned drawbacks and provide pumps of lesser weight.

Briefly, in accordance with the present invention a frame has two wheels, preferably two toothed wheels, journaled thereon, said wheels being in line with each other and spaced from each other, the axles of both wheels being linked to said frame parallel to each other, and being rotatable on said bearers; there being linked to both wheels an endless drive chain, preferably a roller or link chain. At least one of said wheels is driven by a drain means. A plate, substantially parallel with said wheels and projecting into the area enclosed by said chain until it basically coincides with the height of the axle of both wheels is secured to the chain. The plate is linked to the chains, and the free end of said plate, coinciding with the straight line which connects the two wheel axles has the end of the rod of the piston or plunger of a pump connected thereto. This permits operating said pump piston or plunger alternatively and with a long travel, it being possible moreover selectively to modify at will the stroke of the plunger, eliminating the big driving counterpoise masses in known pumps, also reducing the bulk of the drive mechanism, making it possible to install it on mobile and/or self-supporting platforms of suitable size, if desired.

In accordance with a feature the present invention, a chain guide device is provided. The pump operating mechanism has a dynamic counterpoise incorporates a pair of idler wheels, which in addition to supplementing the guide effect for said chain, provide an extension of the stroke when the mechanism is operating the pump in the lifting mode, i.e. when it is carrying out pumping proper.

In all the figures the same reference numbers relate to the same elements or constituent parts of the unit, in accordance with the example selected for the present explanation.

Figure 1:
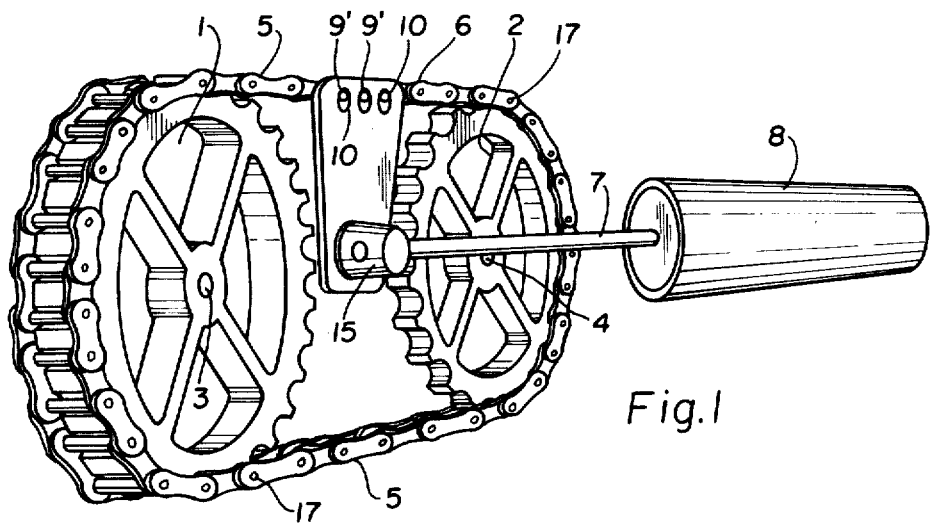
FIG. 1 is a perspective view of the main and essential components of the present invention, greatly simplified and omitting any component not specifically claimed as a basic concept of the same.

FIG. 1 illustrates diagrammatically and in very simplified form a first toothed wheel 1, and parallel with it a second wheel 2, also toothed. These two wheels are in line, one after the other and in the same plane, with a space between them and with their respective axles 3 and 4 in parallel, a drive means such as chain 5 linking the two wheels. Chain 5 is preferably an endless type roller chain, any chain whose last link closes over the first hereinafter being called an "endless chain". For the embodiment of the present invention, it is preferred that said chain, as has already been said, should be a roller chain, but chains of another type maybe used, either known chains and even new types of chains at present unknown. What is important is that this chain 5 must not stretch and must have high shear and elongation strength.

To this chain 5, which encloses a specific area, a plate 6 is linked, projecting into said area enclosed by the chain, in such a way that this plate 6 is always parallel with both wheels 1 and 2, and of course without touching or jamming with them. Plate 6 projects in the way already mentioned up to the imaginary line XX' which connects the axles of said wheels (see FIG. 2). In reality, it is necessary for it to go slightly beyond said line XX' since precisely at the theoretical intersection of plate 6 and XX', the rear end of the rod 7 of the piston of plunger pump 8 is linked to it on a pivotal bearer. Plate 6 can be linked to chain 5 (more specifically to the side of chain 5) by a single linking means such as in and out bolt 9, which allows plate 6 to rotate freely on the bearer provided for it. Nevertheless, it may be useful, for reasons of mechanical strength and kinetics, for this plate 6 to be linked to the side of chain 5 by means of another two bolts 9', possessing the same characteristics as bolt 9, but passing through eyes 10 made in plate 6. Said eyes 10 enable plate 6 to follow chain 5 as it rotates around wheels 1 and 2, since in reality these bolts 9 and 9' are positioned so as to replace the chain bolts of the chain itself, the preferred construction then being the one which uses three consecutive bolts 9-9' instead of three consecutive bolts or pins belonging to chain 5.

Figure 2:
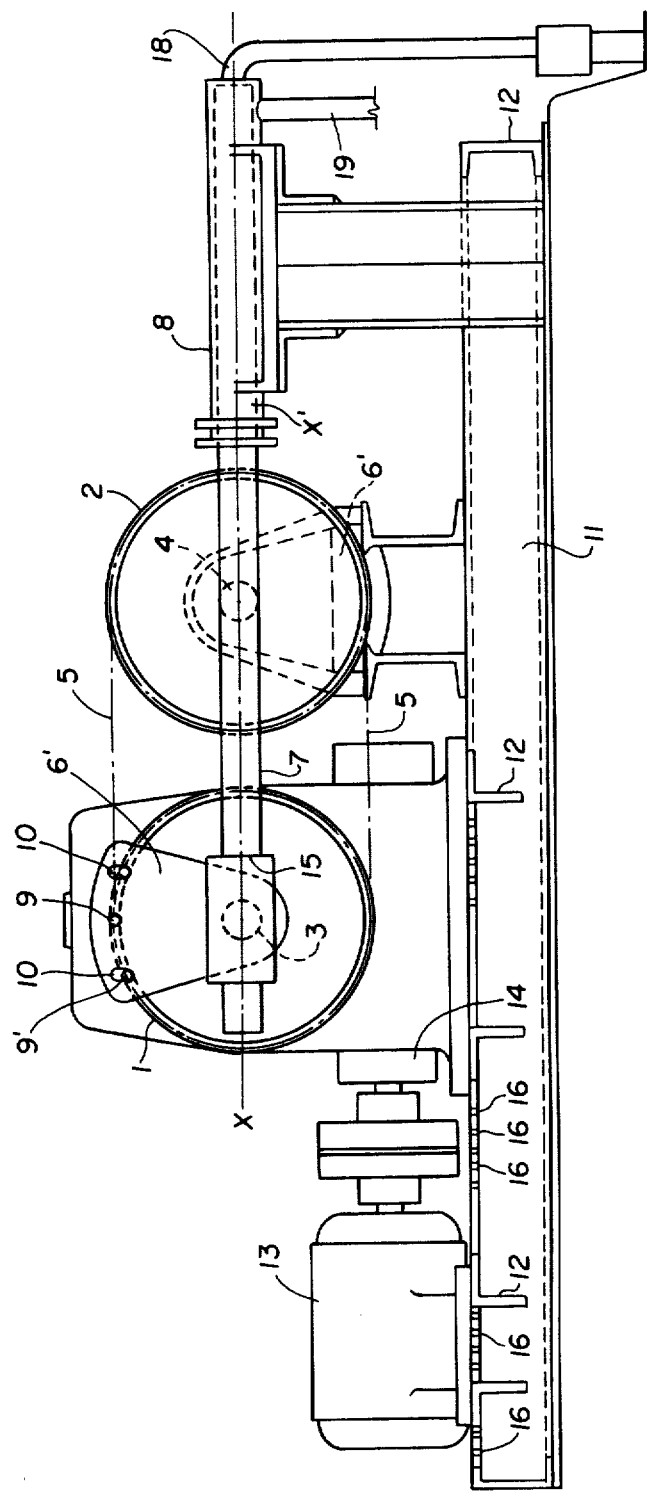
FIG. 2 is an elevation view of a complete installation of the subject of the present invention, ready for operation.

In FIG. 2 we see in greater detail a construction of the present invention in its complete state, i.e. ready for operation. Similarly in this same FIG. 2 we can explain the working of the device: the elements already mentioned are mounted on a frame made up of beams 11 and cross pieces 12 to provide the necessary rigidity, and mounting of the two wheels is effected by support means independently fixed to said frame, or more specifically to beams 11. One of these wheels, preferably the one farthest from pump 8, i.e. wheel 1 in the drawings, is driven by drive means 13 and a reduction gear box 14 interposed between the latter and the axle 3 of wheel 1. We see in the figure how plate 6 follows the travel of chain 5, with which it is integral, and therefore this plate 6 follows a basically elliptical course. The condition which must be met is that the centre of connection of rod 7 to the plate, made by means of a freely rotating coupling bushing 15 must coincide, as has already been said, with straight line XX', so that the basically elliptical movement of said plate 6 is transformed into an alternating movement, parallel with that of straight line XX' of rod 7. This rectilinear movement can undoubtedly be provided by suitable guide bushings and other similar means for the purpose which are already known and therefore not illustrated.

In this FIG. 2 we see how plate 6 has been illustrated in another position, 6', graphically explaining the foregoing.

The pump installation is completed by the suction conduits 18 and the pressure outlet 19.

Of course the pump may be installed vertically, horizontally or even obliquely, without thereby altering what has been explained.

If for any reason it is necessary to change the plunger stroke, this is achieved by moving one of the two wheel bearers in relation to the frame, running said bearer or bearing structure along the desired length.

Of course, when chains 5 are used which possess means of reciprocal meshing with the wheels (in the example illustrated the chain is a roller chain and the wheels are toothed), any movement of one of these wheels must coincide exactly with the extension of the means of reciprocal meshing of the chain. Of course, if this coincidence is not achieved, there will be a virtual extension of the chain, thus throwing out of adjustment the drive and movement of plate 6, which it is critically important should meet its aforementioned conditions, marring the pump drive mechanism. To achieve this aim, it is then necessary to make a plurality of holes in beams 11 or other means of linking the supports of the wheels to them, spaced so that the distance between each pair of adjacent retaining means corresponds exactly with the difference in length of one chain element. In the case of the example of embodiment illustrated, it is preferred to make holes spaced from one another by exactly the distance between each bolt 17 (FIG. 1) of chain 5 links.

Figure 3:
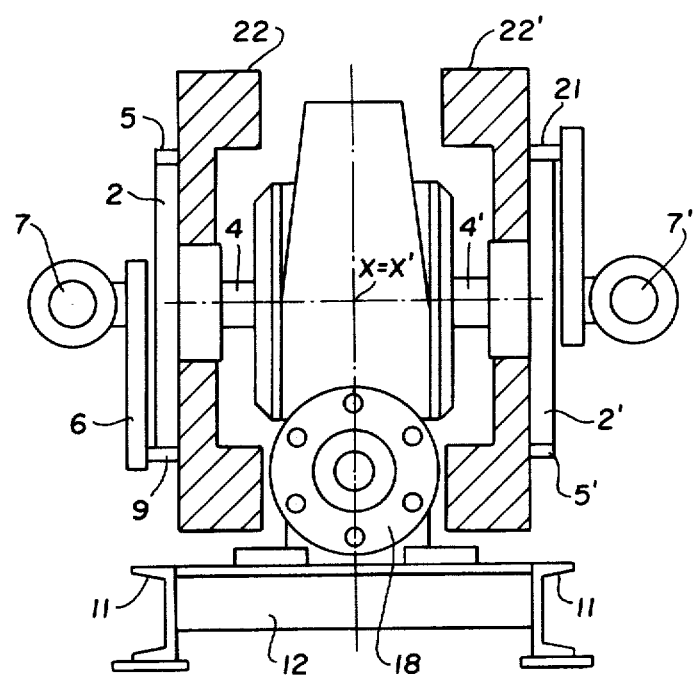
FIG. 3 shows a frontal elevation view of the same object, according to a further variant, in which two pairs of wheels each drive the pistons of a two-cylinder pump.

If, on the other hand, a two-cylinder pump is to be provided, which is very difficult to achieve with known equipment, especially in the oil industry, it is only necessary to arrange on axles 4 and 3 other axles 3' and 4' (see FIG. 3) coaxially with each other, duplicating each pair of wheels in the device illustrated in FIGS. 1 and 2. In this way, the two-cylinder pump will have wheels 1 and 2 on one side of it and wheels 1' and 2' on the other side (in FIG. 3 the pump is seen from the front, from point 18), plates 6 and 20 respectively operating alternately on each respective endless chain 5 and 5'. Similarly, in order to compensate any possible dynamic unbalances in addition to achieving better use of the energy supplied by the drive means, respective balancing masses 22 and 22', designed for the purpose, can be arranged integrally with wheels 1-2 and 1'-2', as is taught by the art.

Figure 4:
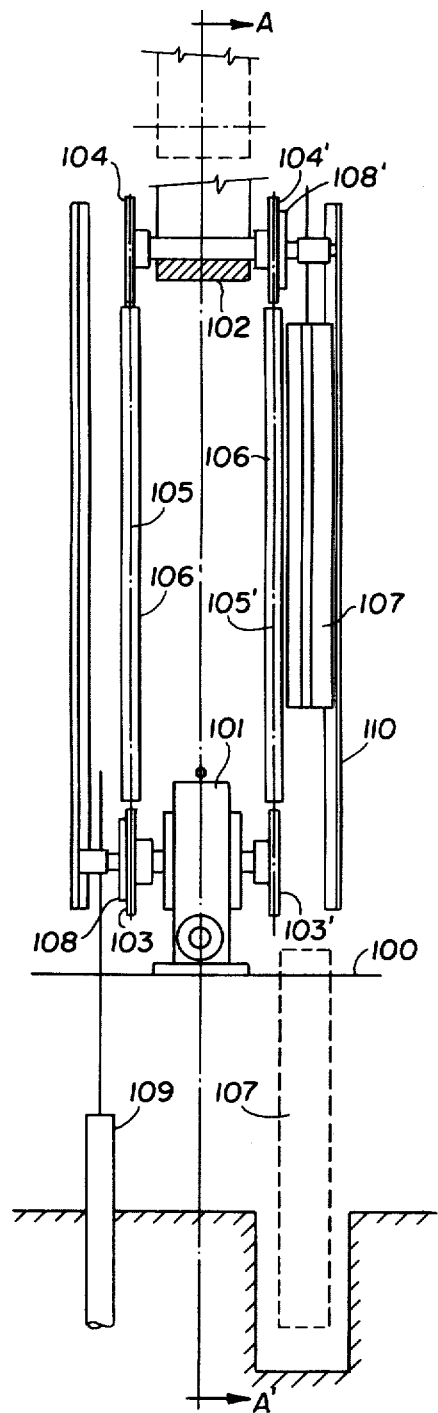
FIG. 4 shows a frontal elevation view of the mechanism with improvements incorporated therein which is the subject of the present filing.

Embodiment of FIG. 4 a base plate 100 has a step-down gear 101 mounted thereon.

Opposite the step-down gear 101 there is the head 102, which is preferably situated perpendicularly to plate 100 and in the same axis of symmetry as gear 101. Step-down gear 101 and head 102 both have a pair of toothed wheels, 103-103' and 104-104' respectively, linked to each other by means of corresponding continuous roller chains 105-105'.

The chains 105, 105', when subjected to heavy loads or stresses, can undergo non-axial deformations. This makes it necessary, in such hypothetical conditions, to incorporate chain guides 106. These guides 106 will be explained later on in relation to FIGS. 6 and 7.

Still on the hypothesis of the mechanism of the present invention operating under high stress conditions, it has also been discovered that a substantial reduction of the torque applied by the head of liquid to be pumped is obtained if a counterpoise 107, linked to plate 108', is added = to the basic mechanism.

This plate 108' (also known in the art as a "fork") is, as has already been explained, associated with one of the chains, e.g. 105', which is linked to the pair of toothed wheels 103'-104'. The existence of this counterpoise provides the dynamic equilibrium necessary to help the mechanism in the critical phases of inertia to surmount the considerable head of fluid pumped by the piston 109 linked to the other plate (or fork) 108, in turn linked to chain 105.

For practical purposes it is calculated that a 7500-kg counterpoise would make it possible to obtain energy equivalent to that of the head of oil to be pumped with a conventional pump existing in a usual and known oil well. This counterpoise 107 conveniently moves on guides 110 for the purpose.

Figure 5:
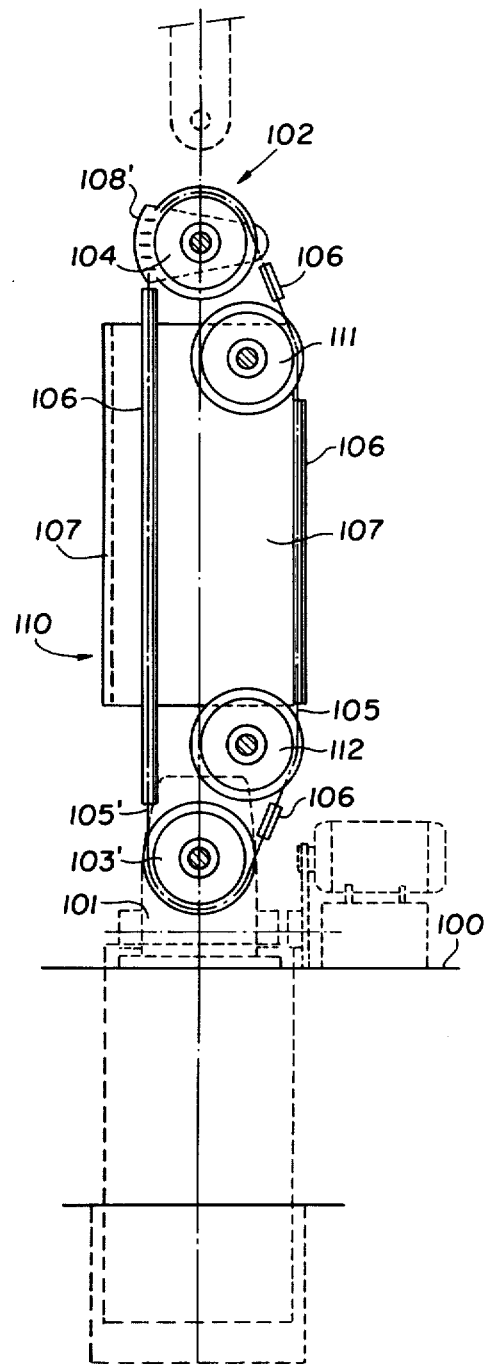
FIG. 5 illustrates the section "AA" in FIG. 4.

Since acceleration of plates 108 and 108' when approaching each dead point is undesirable due to the existence of phenomena of discontinuity in the fluid flow, the start of cavitations and a higher incidence of dynamic loads on the chain, the incorporation of at least two idler wheels 111 and 112 (FIG. 5) makes it possible to lengthen the stroke when said counterpoise descends, i.e. makes it descend at a slower speed, thus regulating the speed of loading of its dynamic action. These idler wheels 111 and 112 can be adjusted and moved at will, within specific limits, and therefore also act as efficient regulators of the tension of the chain and compensate any possible stretching. These wheels also act as guides for the aforesaid chains 105.

Figure 6:
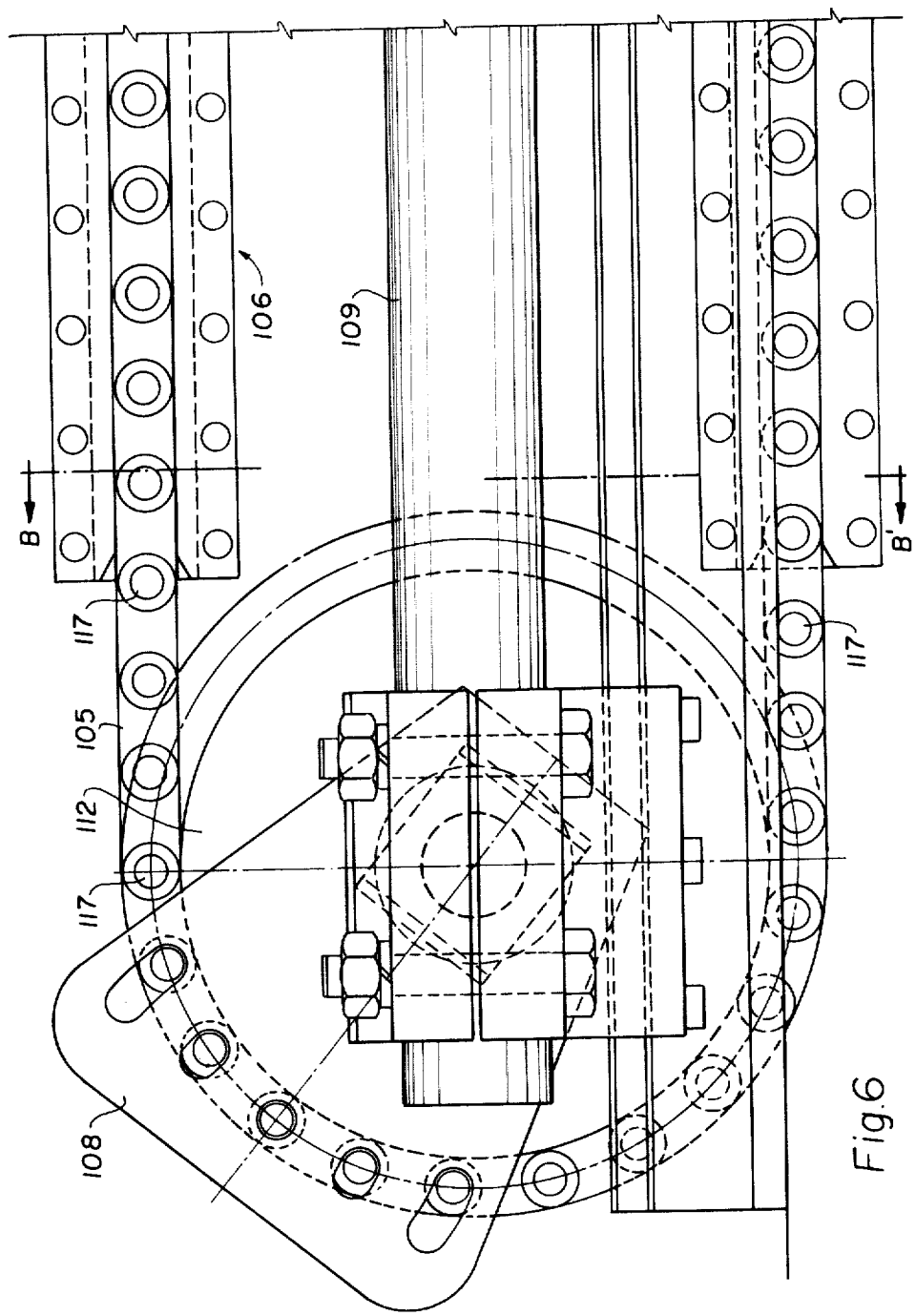
FIG. 6 shows the chain guides in side elevation.
Figures 7, 8:
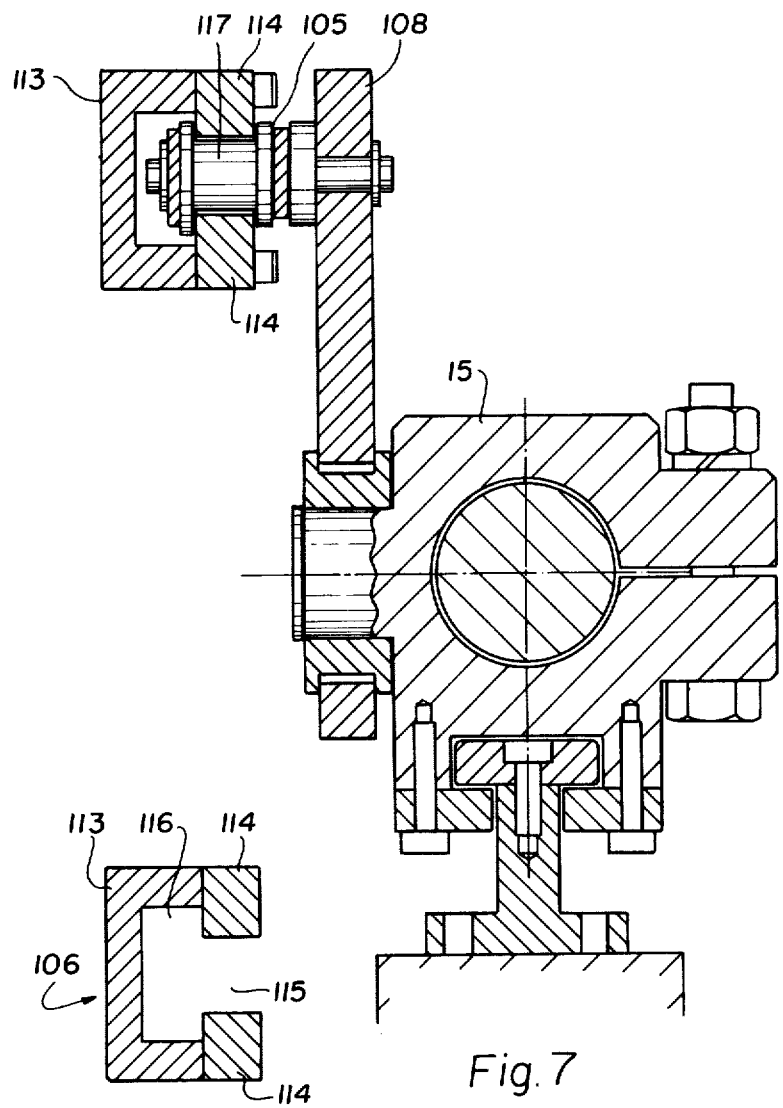
FIG. 7 shows along section "BB" of FIG. 6 how the aforesaid chain guide really constitutes a roller race for the rollers linking the links of said chain.
FIG. 8 is an end view of a chain guide element with the chain removed.

As has already been mentioned, the high stresses can cause non-axial deformation of chans 105 and 105', therefore provision has been made for the adoption of chain guides 106 (see FIGS. 6 and 7).

These chain guides 106 consist of a body 113 (FIG. 8), basically U-shaped, with the opening facing towards plate 108. Inside the longitudinal groove 116 open at both ends and defined by this opening, the chain is positioned (or the corresponding length of it), having a projection 114 at the end of each longitudinal edge of each U so that the two projections 114 define a longitudinal groove 115, also open at both ends less widely than the housing defined by 116. The dimensions of this groove width 115 are equal to the diameter of each roller 117, so that this is guided and supported by the facing surfaces of each projection 114.

The side and longitudinal surfaces of each projection 114 act as retaining walls for the sides of the links and absorb the whole of the stresses whose component is transversal to the longitudinal axis of the chain.

The toothed wheels belonging to one pair are of the same diameter, but those of the other pair can be of different diameter, a further factor regulating the dynamic action of the loads applied.

When making improvements to a mechanism operating a pump using the means here described and exemplified, modifications and/or improvements may be introduced which are all to be considered as being included within the scope of protection provided by the present patent, which scope is fundamentally determined by the text of the following claims clauses.

Having described and illustrated the nature and main object of the present invention and the manner in which the same can be put in practice, it is declared that what is claimed is the sole right of the applicant:

1. Pump operating mechanism to provide a long power stroke for a pump piston rod (7) or the like having a support frame (11, 12);

two spaced wheels (1, 2) mounted on said frame, aligned in a single plane and having parallel axes of rotation;

an endless roller link chain (5) looped about said wheels, said chain defining an area enclosed therein within which said wheels are positioned;

drive means (13) drivingly connected to at least one of said wheels;

a plate (6);

means (15) pivotally connecting the piston rod (7) to the plate;

and attachment means securing said plate (6) to said chain (5) comprising three bolts (9, 9') corresponding to an equal number of pins joining links of the roller link chain adjacent each other, said plate being formed with openings receiving said bolts, the end openings being elongated to permit travel of the chain, with the plate attached, about said wheel and pivoting by the plate with respect to the links of the link chain;

said plate projecting into said area, being positioned parallel to the wheels and a small distance from them, and extending at least two an imaginary line connecting the two axes of said wheels, the free end of said plate coinciding with said imaginary axis of alignment of the axes of the wheels, the plate moving in unison with said chain and pivoting in a plane parallel to the plane of said wheels, the piston rod pivot means (13) being positioned on said plate at said imaginary straight line and remaining at all times contained in an imaginary parallel and aligned plane including said line and at the same level as said imaginary straight line which connects the axes of said wheels.

2. Mechanism according to claim 1 characterised in that said chain comprises a roller chain, and said wheels are toothed wheels meshing said chain on the teeth of each corresponding portion of wheel.

3. Mechanism according to claim 1, wherein the frame has a plurality of adjustable support means for supporting the wheels (1, 2) and drive means (13), the support means for the wheels being spaced by exactly the distance between each pin in consecutive links of the chain.

4. Mechanism according to claim 1, wherein two sets of toothed wheels are provided, arranged in pairs, the wheels in each pair being aligned with each other and with their axes positioned in parallel, each axis of the mechanism being common to said wheels;

the individual chains being provided, looped over respective wheels of respective pairs;

plates linked to the chains, a plate linked to one of said chains being arranged on one pair of said wheels and linked to said piston rod of the pump;

and a counterpoise mass, the plate being associated with the other chain being linked to said counterpoise mass;

said piston rod (7) and said counterpoise mass moving along respective operating straight lines parallel with each other and parallel with the axes of each aligned pair of wheels.

5. Improvements according to claim 4 characterised by the fact that the toothed wheels belonging to the same pair are of the same diameter, while the toothed wheels of the other pair are of different diameter.

6. Mechanism according to claim 4, further including at least one idler wheel having an axis of rotation parallel to that of said two wheels and engaging the chain having said counterpoise mass secured thereto, the axis of rotation of said idler wheel being parallel to that of said two wheels, and the length of the chain connecting said wheels and supporting the plate linked to said counterpoise mass being longer than the length of the chain linked to the plate to which the piston rod (7) of the pump is pivoted.

7. Mechanism according to claim 1 or 4, further including a guideway for at least one of the roller link chains, said guideway comprising a generally U-shaped structure defining a longitudinal groove, open at both ends, and having facing surfaces to form slip ways for the rollers of the rollers links of said roller link chain.

8. Improvements according to claim 7 characterised by the fact that said groove has a U-shaped transversal section on whose respective longitudinal edges there are projections which define a narrower, longitudinal groove open at both ends, the facing surfaces of said groove being the slipways and guides for the rollers of said chain, while the side surfaces of said projections constitute stops delimiting the lateral movement of the chains thereof.

* * * * *